UNITED STATES PATENT OFFICE.

ALEXANDER L. STRAUS, OF BALTIMORE, MARYLAND.

PROCESS OF PRODUCING SOFT DRINKS.

1,337,027.  Specification of Letters Patent.  Patented Apr. 13, 1920.

No Drawing.  Application filed November 14, 1919. Serial No. 338,082.

*To all whom it may concern:*

Be it known that I, ALEXANDER L. STRAUS, a citizen of the United States, residing at Baltimore, in the State of Maryland, have invented certain new and useful Improvements in Processes of Producing Soft Drinks; and I do hereby declare the following to be a full, clear, and exact description of the invention, such as will enable others skilled in the art to which it appertains to make and use the same.

This invention relates to a process of producing a soft drink having a small quantity of alcohol therein, and has for its object to improve the flavor of the similar drinks heretofore proposed.

With this and other objects in view the invention consists in the novel steps and combinations of steps constituting the process, all as will be more fully hereinafter described and particularly pointed out in the claims.

In carrying out this invention, I make a non-alcoholic beer by first making an alcoholic beer, and then boiling out the alcohol and adding ingredients to restore the taste and flavor of the alcoholic beer, all as is disclosed in my prior Patent #1,223,121, dated April 17, 1917.

Briefly, said patented procedure involves the boiling of the regular alcoholic beer for a predetermined time to get rid of the alcohol present. But this boiling operation has the effect of so changing or cooking the albuminoids and other compounds present that the flavor of the original beer is destroyed. To restore this flavor, I add predetermined quantities of water, salt, hops, a sweetening material, such as syrup or sugar, a bitter tasting material, such as quassia or concentrated hops, a foam producing material, such as gum arabic, a preservative such as potassium meta bi-sulfite, and in addition I may add small quantities of citric acid to increase the pungency of the taste. But my present procedure differs from my patented procedure in the following particulars:—

Instead of fining, filtering and carbonating the non-alcoholic beer produced in following the disclosure of my said patent, I take said non-alcoholic beer and before fining the same, I add say one half (½) pound of yeast per barrel thereto and let it ferment for say four days at the ordinary cellar temperature of about 4° Ré. I have found that after the alcohol is boiled from the beer made the subject of my said prior patent, there is left therein sufficient fermentable matter to produce an alcoholic content of about (.2 per cent.) two tenths of one per cent., and that if said beer is subjected to the above mentioned fermentation, substantially all this fermentable matter will have disappeared.

The removal of this said fermentable matter changes the flavor of the resulting beer, and this feature, added to the change wrought by the yeast, serves to materially improve the flavor of the beer of this process over that of the said patented process. Further, by selecting different yeasts, different flavors are readily imparted to the finished beer, and so efficient is this method of procedure, that I find I can imitate the taste and flavors of particular brands of alcoholic beers so closely that even experienced beer drinkers have been unable to detect the difference.

After the beer has been thus fermented, I run it into chip casks, fine it, and may subject it to a slight preliminary carbonation, using say only a pressure of 4 or 5 pounds. The beer is next filtered and preferably again slightly carbonated as before. I next run the beer into a chip cask and subject it to a thorough carbonation using a pressure of say 15 or 20 pounds. The beer is next filtered again, when it may be held for the market.

One or both of the preliminary carbonations may be omitted, but I find that a thorough carbonation is very essential to a high class flavor in non-alcoholic beers, and that preliminary carbonations greatly facilitate the attainment of a thorough carbonation in that they seem to cause the beer to absorb more gas.

It is obvious that those skilled in the art may vary the details of the process without departing from the spirit of the invention, and therefore I do not wish to be limited to the above disclosure except as may be required by the claims.

What I claim is:—

1. The steps in a process of controlling the taste of a substantially non-alcoholic beer, which consist in boiling out the alcohol from alcoholic beer that has undergone an alcoholic fermentation; adding to the residue a carbohydrate sweetening material, salt and hops; fermenting to an alcoholic content of less than one half of one per cent.; filtering the mixture thus produced; and finally carbonating the product; substantially as described.

2. The steps in a process of controlling the taste of a substantially non-alcoholic beer that has undergone an alcoholic fermentation; which consist in boiling out the alcohol from said alcoholic beer; adding to the residue water, a carbohydrate sweetening material, salt and hops; fermenting said beer to an alcoholic content of less than one half of one per cent.; fining and filtering the mixture thus produced; and finally carbonating the product; substantially as described.

3. The steps in a process of controlling the taste of a substantially non-alcoholic beer, which consist in boiling out the alcohol from alcoholic beer that has undergone an alcoholic fermentation; adding to the residue water, an agent to impart a bitter taste to the beer, a carbohydrate sweetening material, salt and hops; fermenting said beer to an alcoholic content not exceeding one half of one per cent.; fining, preliminarily carbonating, and filtering the mixture thus produced; and finally carbonating the product, substantially as described.

4. The steps in a process of controlling the taste of a substantially non-alcoholic beer, which consist in boiling out the alcohol from alcoholic beer that has undergone an alcoholic fermentation; adding to the residue water, concentrated hops, a foam producing material, a carbohydrate sweetening material, salt and hops; fermenting said beer to an alcoholic content less than one half of one per cent.; fining, carbonating, and filtering the mixture thus produced; carbonating again, filtering a second time, and finally carbonating the product, substantially as described.

5. The steps in a process of controlling the taste of a substantially non-alcoholic beer, which consists in boiling out the alcohol from fermented alcoholic beer; adding to the residue sufficient citric acid to produce a pungent taste; water, a carbohydrate sweetening material, salt and hops; fermenting said beer to an alcoholic content less than one half of one per cent.; filtering the mixture thus produced; and finally carbonating the product, substantially as described.

In testimony whereof I affix my signature.

ALEXANDER L. STRAUS.